(12) United States Patent
Yamazaki et al.

(10) Patent No.: US 10,056,655 B2
(45) Date of Patent: Aug. 21, 2018

(54) MANUFACTURING METHOD OF NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Nobuyuki Yamazaki, Toyota (JP); Masanori Kitayoshi, Toyota (JP); Takashi Miura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 262 days.

(21) Appl. No.: 14/919,190

(22) Filed: Oct. 21, 2015

(65) Prior Publication Data
US 2016/0118692 A1 Apr. 28, 2016

(30) Foreign Application Priority Data
Oct. 27, 2014 (JP) .................. 2014-218234

(51) Int. Cl.
*H01M 10/05* (2010.01)
*H01M 10/44* (2006.01)
*H01M 4/04* (2006.01)
*H01M 4/131* (2010.01)
*H01M 4/1391* (2010.01)
(Continued)

(52) U.S. Cl.
CPC ....... *H01M 10/446* (2013.01); *H01M 4/0404* (2013.01); *H01M 4/131* (2013.01); *H01M 4/1391* (2013.01); *H01M 4/505* (2013.01); *H01M 4/525* (2013.01); *H01M 4/62* (2013.01); *H01M 10/052* (2013.01); *H01M 10/0568* (2013.01); *H01M 4/5825* (2013.01)

(58) Field of Classification Search
CPC ................ H01M 10/0568; H01M 4/5825
See application file for complete search history.

(56) References Cited

U.S. PATENT DOCUMENTS

| | | | |
|---|---|---|---|
| 2003/0068551 | A1 | 4/2003 | Fukunaga et al. |
| 2008/0048057 | A1 | 2/2008 | Naka et al. |

(Continued)

FOREIGN PATENT DOCUMENTS

| | | |
|---|---|---|
| CN | 103296280 A | 9/2013 |
| JP | 10106552 A | 4/1998 |

(Continued)

*Primary Examiner* — Ula Corinna Ruddock
*Assistant Examiner* — Frank A Chernow
(74) *Attorney, Agent, or Firm* — Sughrue Mion, PLLC

(57) ABSTRACT

A manufacturing method of a nonaqueous electrolyte secondary battery includes: a lithium phosphate dispersion manufacturing step of manufacturing a lithium phosphate dispersion by dispersing lithium phosphate in a solvent without adding a positive-electrode active material; a positive electrode mixture paste manufacturing step of manufacturing a positive electrode mixture paste by mixing the lithium phosphate dispersion with a positive electrode material including the positive-electrode active material; and a step of manufacturing a positive electrode including a positive electrode mixture layer on a surface of a current collector member by applying the positive electrode mixture paste on the surface of the current collector member and drying the positive electrode mixture paste.

3 Claims, 10 Drawing Sheets

(51) Int. Cl.
- *H01M 4/505* (2010.01)
- *H01M 4/525* (2010.01)
- *H01M 4/62* (2006.01)
- *H01M 10/052* (2010.01)
- *H01M 10/0568* (2010.01)
- *H01M 4/58* (2010.01)

(56) References Cited

U.S. PATENT DOCUMENTS

| | | | |
|---|---|---|---|
| 2008/0063941 A1* | 3/2008 | Itaya | H01M 4/13 429/231.95 |
| 2009/0092900 A1* | 4/2009 | Obana | H01M 2/166 429/223 |
| 2013/0219703 A1 | 8/2013 | Mitsuhashi | |

FOREIGN PATENT DOCUMENTS

| | | | |
|---|---|---|---|
| JP | 2003045432 A | 2/2003 | |
| JP | 2007207650 A | 8/2007 | |
| JP | 2012003985 A | 1/2012 | |
| JP | 2013004355 A | 1/2013 | |
| JP | 2013171816 A | 9/2013 | |
| JP | 2013175325 A | 9/2013 | |
| JP | 2014082050 A | 5/2014 | |
| JP | 2014-103098 A | 6/2014 | |
| JP | 2016-081738 A | 5/2016 | |
| KR | 1020070111529 A | 11/2007 | |
| WO | 2014/064513 A1 | 5/2014 | |

* cited by examiner

MANUFACTURING METHOD OF NONAQUEOUS ELECTROLYTE SECONDARY BATTERY

INCORPORATION BY REFERENCE

The disclosure of Japanese Patent Application No. 2014-218234 filed on Oct. 27, 2014 including the specification, drawings and abstract is incorporated herein by reference in its entirety.

BACKGROUND OF THE INVENTION

1. Field of the Invention

The present invention relates to a manufacturing method of a nonaqueous electrolyte secondary battery.

2. Description of Related Art

There has been known a nonaqueous electrolyte secondary battery including a positive-electrode active material (e.g., a lithium nickel manganese oxide having a spinel structure) having an operation upper limit potential of 4.35 V or more on the metal lithium basis. In the nonaqueous electrolyte secondary battery, when a potential of the positive-electrode active material (equivalent to a potential of a positive electrode) reaches 4.35 V or more by performing initial charge or the like, a solvent in a nonaqueous electrolyte is decomposed by oxidation on a surface of the positive-electrode active material, so that hydrogen ions generated hereby are reacted with fluorine ions in the nonaqueous electrolyte, which might generate hydrofluoric acid (HF). Due to an action of the hydrofluoric acid, transition metals in the positive-electrode active material are eluted, which might decrease battery performance.

In this regard, Japanese Patent Application Publication No. 2014-103098 (JP 2014-103098 A) describes a technique in which lithium phosphate is contained in a positive electrode mixture layer, so that hydrofluoric acid generated as described above is reacted with lithium phosphate ($Li_3PO_4$) so that the hydrofluoric acid is reduced, thereby reducing elution of transition metals in a positive-electrode active material. More specifically, in JP 2014-103098 A, the positive-electrode active material, a conductive material, a binder, lithium phosphate, and a solvent are kneaded (stirred), so as to manufacture a positive electrode mixture paste. Then, the positive electrode mixture paste thus manufactured is applied to a power collection member and then dried, so as to manufacture a positive electrode including a positive electrode mixture layer containing lithium phosphate.

However, in the manufacturing method described in JP 2014-103098 A, a good dispersion degree of lithium phosphate in the positive electrode mixture layer might not be obtained. More specifically, when the positive electrode mixture paste is manufactured, for example, lithium phosphate is aggregated (or aggregated lithium phosphate cannot be crushed), which decreases dispersibility of lithium phosphate in the positive electrode mixture paste, thereby resulting in that a dispersion degree of lithium phosphate in the positive electrode mixture layer might be lowered. Note that, if a kneading (stirring) energy of the positive electrode mixture paste is raised in order to raise dispersibility of lithium phosphate, the positive-electrode active material is broken. For this reason, any method that increases a kneading (stirring) energy cannot be employed as a method to raise the dispersibility of lithium phosphate.

If a dispersion degree of lithium phosphate in the positive electrode mixture layer is not good (lithium phosphate is not uniformly dispersed in the positive electrode mixture layer to some extent), lithium phosphate cannot be appropriately reacted with hydrofluoric acid generated on surfaces of many positive-electrode active materials dispersed in the whole positive electrode mixture layer, which might not be able to prevent elution of transition metals in the positive-electrode active material appropriately.

SUMMARY OF THE INVENTION

The present invention provides a manufacturing method of a nonaqueous electrolyte secondary battery that can achieve a good dispersion degree (a good diffusion degree) of lithium phosphate in a positive electrode mixture layer.

An aspect of the present invention relates to a manufacturing method of a nonaqueous electrolyte secondary battery, the manufacturing method including: a lithium phosphate dispersion manufacturing step of manufacturing a lithium phosphate dispersion by dispersing lithium phosphate in a solvent without adding a positive-electrode active material; a positive electrode mixture paste manufacturing step of manufacturing a positive electrode mixture paste by mixing the lithium phosphate dispersion with a positive electrode material including a positive-electrode active material having an operation upper limit potential of 4.35 V or more on the metallic lithium basis; a step of manufacturing a positive electrode including a positive electrode mixture layer on a surface of a current collector member by applying the positive electrode mixture paste on the surface of the current collector member and drying the positive electrode mixture paste; a step of assembling the nonaqueous electrolyte secondary battery by accommodating, in a battery outer case, the positive electrode, a negative electrode, and a nonaqueous electrolyte containing a compound having fluorine element; and a step of performing initial charge on the nonaqueous electrolyte secondary battery.

As such, in the manufacturing method, in order to manufacture the positive electrode mixture paste, the lithium phosphate dispersion is initially manufactured by dispersing (performing a process of dispersing) the lithium phosphate in the solvent without adding the positive-electrode active material, in the lithium phosphate dispersion manufacturing step. Thus, by performing the process of dispersing the lithium phosphate in the solvent without including the positive-electrode active material, no crack of the positive-electrode active material occurs in the dispersion process (there is no possibility that cracks of the positive-electrode active material occur). On this account, in the lithium phosphate dispersion manufacturing step, the ability of the dispersion process can be raised to such an extent that a good dispersion degree of the lithium phosphate can be achieved. In other words, the dispersion degree of the lithium phosphate in the solvent can be raised without causing cracks of the positive-electrode active material. Accordingly, in the lithium phosphate dispersion manufacturing step, a lithium phosphate dispersion with a good dispersion degree of lithium phosphate can be manufactured.

After that, in the positive electrode mixture paste manufacturing step, the lithium phosphate dispersion with a good dispersion degree of the lithium phosphate is mixed with the positive electrode material including the positive-electrode active material, so that the positive electrode mixture paste with a good dispersion degree of the lithium phosphate can be manufactured. As a result, a good dispersion degree of the lithium phosphate can be achieved in the positive electrode mixture layer formed by drying the positive electrode mixture paste.

Accordingly, in the step of performing initial charge on the nonaqueous electrolyte secondary battery, "when a potential of the positive-electrode active material (equivalent to a potential of the positive electrode) reaches 4.35 V or more, so that the solvent in the nonaqueous electrolyte is decomposed by oxidation on a surface of the positive-electrode active material and hydrogen ions generated hereby are reacted with fluorine ions in the nonaqueous electrolyte so as to generate hydrofluoric acid (HF)," a probability that the hydrofluoric acid thus generated is reacted with the lithium phosphate is increased, thereby making it possible to effectively reduce the hydrofluoric acid thus generated. As a result, it is possible to reduce elution of transition metals in the positive-electrode active material due to an action of the hydrofluoric acid. Note that, in a case where the hydrofluoric acid thus generated cannot be reacted with the lithium phosphate on the surface of the positive-electrode active material, the hydrofluoric acid migrates to the negative electrode and generates hydrogen gas.

Further, due to the reaction between the hydrofluoric acid and the lithium phosphate on the surface of the positive-electrode active material, a protective coating (which is presumably a coating in which a compound having elemental fluorine is mixed with a compound having elemental phosphorus) is formed on the surface of the positive-electrode active material. In the above manufacturing method, a good dispersion degree (degree of dispersion) of the lithium phosphate of the positive electrode mixture layer can be obtained, so that a protective coating is easily formed on a surface of each positive-electrode active material in the positive electrode mixture layer. Since the protective surface film is formed, in a case where the battery is charged subsequently until the potential of the positive-electrode active material (equivalent to the potential of the positive electrode) reaches 4.35 V or more, it is possible to restrain the solvent of the nonaqueous electrolyte from being decomposed by oxidation on the surface of the positive-electrode active material.

Further, the "positive-electrode active material having an operation upper limit potential of 4.35 V or more on the metallic lithium basis" indicates a positive-electrode active material in which an oxidation-reduction potential (an operation potential) of the positive-electrode active material is 4.35 V (vs.Li/Li$^+$) or more within a range in which an SOC (State of Charge) of the nonaqueous electrolyte secondary battery manufactured by the above manufacturing method is 0% to 100%. The nonaqueous electrolyte secondary battery containing the positive-electrode active material has a region where the potential of the positive electrode (equivalent to the potential of the positive-electrode active material) reaches 4.35 V (vs.Li/Li$^+$) or more within the range where the SOC is 0% to 100%.

For example, as the positive-electrode active material, a lithium nickel manganese oxide having a spinel structure can be used. Further, a lithium transition metal phosphate compound having an olivine structure of $LiMnPO_4$, $LiNiPO_4$, or $LiCoPO_4$ can be also used. Note that the lithium transition metal phosphate compound of $LiMnPO_4$ is a compound in which a basic composition is represented by $LiMnPO_4$, and includes a compound in which part of Mn (less than 50%) is replaced with other transition metals, as well as $LiMnPO_4$. Further, the lithium transition metal phosphate compound of $LiNiPO_4$ is a compound in which a basic composition is represented by $LiNiPO_4$, and includes a compound in which part of Ni (less than 50%) is replaced with other transition metals, as well as $LiNiPO_4$. Further, the lithium transition metal phosphate compound of $LiCoPO_4$ is a compound in which a basic composition is represented by $LiCoPO_4$, and includes a compound in which part of Co (less than 50%) is replaced with other transition metals, as well as $LiCoPO_4$.

Further, the lithium phosphate dispersion manufacturing step may include a passing step of sending, into a nozzle, a mixture in which the lithium phosphate is mixed with the solvent, so that the mixture passes through a through hole of a liquid passage portion placed in the nozzle; and among those dimensions of the through hole which are prescribed by lengths of segments (segments placed inside an outside line of the through hole) obtained by cutting, by the outside line, straight lines passing through a centroid of a pattern indicated by the outside line on a cut surface obtained by cutting the liquid passage portion along a direction perpendicular to a direction where the through hole extends, the minimum dimension of the through hole which corresponds to a length of a shortest segment may be 200 μm or less.

As such, the minimum dimension (the minimum dimension at a position passing through the centroid) of the through hole on a section of the liquid passage portion is set to 200 μm or less. Hereby, when the mixture in which the lithium phosphate is mixed with the solvent passes through the through hole, a shearing force can be applied to aggregated lithium phosphate particles, appropriately. Accordingly, when the mixture in which the lithium phosphate is mixed with the solvent passes through the through hole, the aggregated lithium phosphate particles can be crushed appropriately (besides, primary particles of the lithium phosphate can be partially ground to be pulverized). Hereby, by performing the passing step, a lithium phosphate dispersion with a good dispersion degree of lithium phosphate can be manufactured.

Note that, in a case were the through hole of the liquid passage portion has a circular shape (a cylindrical shape), the "pattern indicated by the outside line of the through hole on the cut surface obtained by cutting the liquid passage portion along the direction perpendicular to the direction where the through hole of the liquid passage portion extends" is a "circle," and its "centroid" is a "center of the circle." Further, "the segments obtained by cutting, by the outside line, the straight lines passing through the centroid of the pattern" are segments each indicative of a diameter of the circle, and "the minimum dimension of the through hole which corresponds to the length of the shortest segment" corresponds to a length of the diameter of the circle.

Further, in a case were the through hole of the liquid passage portion has a rectangular shape (a rectangular cylindrical shape), the "pattern indicated by the outside line of the through hole on the cut surface obtained by cutting the liquid passage portion along the direction perpendicular to the direction where the through hole of the liquid passage portion extends" is a "rectangular shape (an oblong shape)," and "the minimum dimension of the through hole which corresponds to the length of the shortest segment" corresponds to a length of a short side of the rectangular shape (the oblong shape).

Further, in a case were the through hole of the liquid passage portion has an elliptical shape (an elliptical cylindrical shape), the "pattern indicated by the outside line of the through hole on the cut surface obtained by cutting the liquid passage portion along the direction perpendicular to the direction where the through hole of the liquid passage portion extends" is an "elliptical shape," and "the minimum dimension of the through hole which corresponds to the length of the shortest segment" corresponds to a length of a short diameter (a short axis) of the elliptical shape.

Note that that position in the through hole which corresponds to the centroid of the pattern indicated by the outside line is a position where a flow speed of the mixture passing through the through hole is fastest. Accordingly, it is considered that "the length of the shortest segment among the segments passing through the centroid" largely affects a crushing degree of the lithium phosphate particles.

Further, it is preferable that the minimum dimension of the through hole be 100 μm or more. Even if the minimum dimension of the through hole is made smaller than 100 μm, a crushing degree (grindability) of the lithium phosphate particles is at the same level as a case where the minimum dimension is 100 μm, and meanwhile, the mixture is hard to pass through the through hole.

Further, in the passing step, a pressure to be applied to the mixture in order that the mixture passes through the through hole of the liquid passage portion may be 5 MPa or more.

By applying a pressure of 5 MPa or more to the mixture as such, a flow speed of the mixture passing through the through hole can be raised. Accordingly, a large shearing force can be applied to the lithium phosphate particles passing through the through hole. Hereby, the aggregated lithium phosphate particles can be crushed effectively (besides, primary particles of the lithium phosphate can be partially ground to be pulverized). Accordingly, by performing the passing step, a lithium phosphate dispersion with a further preferable dispersion degree (a high dispersion degree) of lithium phosphate can be manufactured.

Note that it is preferable that the pressure to be applied to the mixture be 200 MPa or less. Even if the pressure is set larger than 200 MPa, the crushing degree (grindability) of the lithium phosphate is at the same level as a case where the pressure is 200 MPa. Thus, from the viewpoint of energy efficiency, it is preferable that the pressure be 200 MPa or less.

Further, in the passing step, a temperature of the mixture may be 50° C. or more.

When the temperature of the mixture (the mixture of the lithium phosphate and the solvent) is 50° C. or more in the passing step, at least part of the lithium phosphate can be dissolved in the solvent. Thus, at least part of lithium phosphate is dissolved, thereby making it possible to raise dispersibility of the lithium phosphate in the mixture and in the lithium phosphate dispersion. This makes it possible to raise a dispersion degree of the lithium phosphate in the positive electrode mixture paste, and consequently, a dispersion degree of the lithium phosphate can be raised in the positive electrode mixture layer formed by drying the positive electrode mixture paste.

Note that it is preferable that a temperature of the mixture be a temperature less than a solvent boiling point. For example, in a case where NMP is used as the solvent, it is preferable that the temperature of the mixture be 200° C. or less. Further, for example, in a case where water is used as the solvent, it is preferable that the temperature of the mixture be less than 100° C.

Further, the positive-electrode active material may be a lithium nickel manganese oxide having a spinel structure.

The lithium nickel manganese oxide having a spinel structure is preferable as a positive-electrode active material having an operation upper limit potential of 4.35 V or more on the metallic lithium basis. More specifically, even if the potential of the positive-electrode active material reaches 4.35 V or more on the metallic lithium basis, its crystal structure is stable. In view of this, with the use of the positive-electrode active material, it is possible to obtain a nonaqueous electrolyte secondary battery that can sufficiently endure such usage in which the battery is set to a high voltage.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
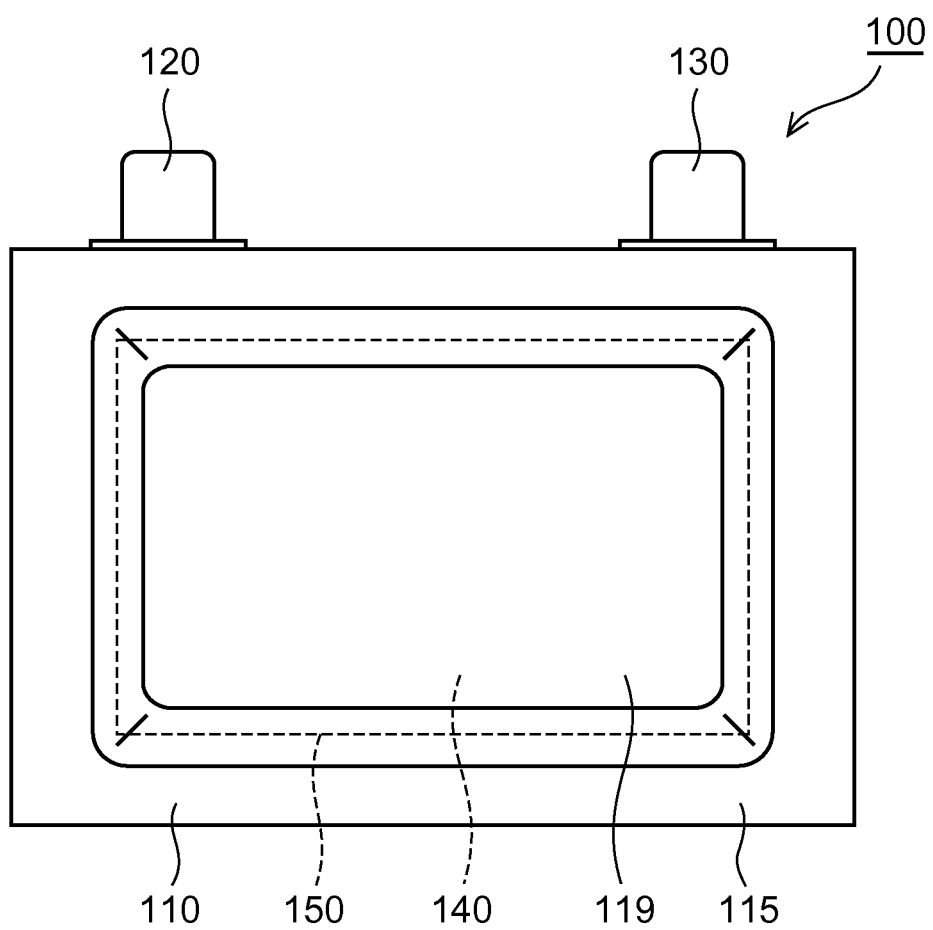
FIG. 1 is a plan view of a nonaqueous electrolyte secondary battery according to an embodiment.

Next will be described an embodiment of the present invention with reference to the drawings. FIG. 1 is a plan view of a nonaqueous electrolyte secondary battery 100 according to the present embodiment. The nonaqueous electrolyte secondary battery 100 of the present embodiment is a lithium ion secondary battery, and includes a battery outer case 110 having a rectangular shape in a plan view, a positive terminal 120 extending from an inside of the battery outer case 110 toward its outside, and a negative terminal 130 extending from the inside of the battery outer case 110 toward its outside, as illustrated in FIG. 1.

Figure 2:
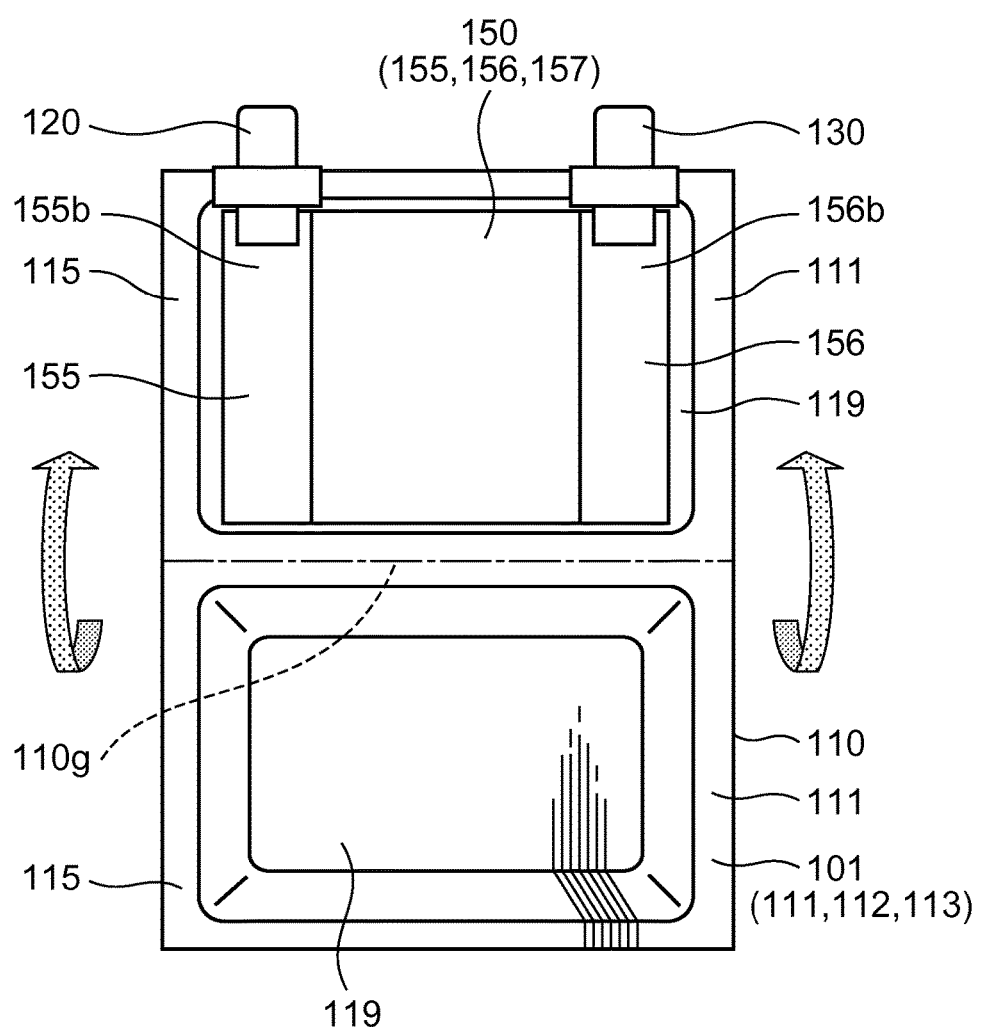
FIG. 2 is a view to describe a manufacturing method of the battery.

The battery outer case 110 is formed of a laminated film 101 in which an inner resin film 111 placed on an innermost side of the battery outer case 110, a metal film 112 placed adjacent to an outer side (a deeper side on a plane of paper in FIG. 2) of the inner resin film 111, and an outer resin film 113 placed adjacent to an outer side of the metal film 112 are laminated (see FIG. 2). As illustrated in FIG. 2, the battery outer case 110 is formed in a rectangular shape in a plan view such that the laminated film 101 in which an electrode body 150 is placed in a receptacle portion 119 is folded at a folding position 110g, and a generally rectangular annular welding sealing portion 115 (a peripheral part of the battery outer case 110) is sealed by thermal welding as illustrated in FIG. 1.

Further, as illustrated in FIG. 2, the electrode body 150 is accommodated inside the battery outer case 110. The electrode body 150 is a flat wound body formed by winding, in a flat shape, a positive electrode 155, a negative electrode 156, and a separator 157 each having an elliptical section and formed in an elongated sheet-shape.

Figure 3:
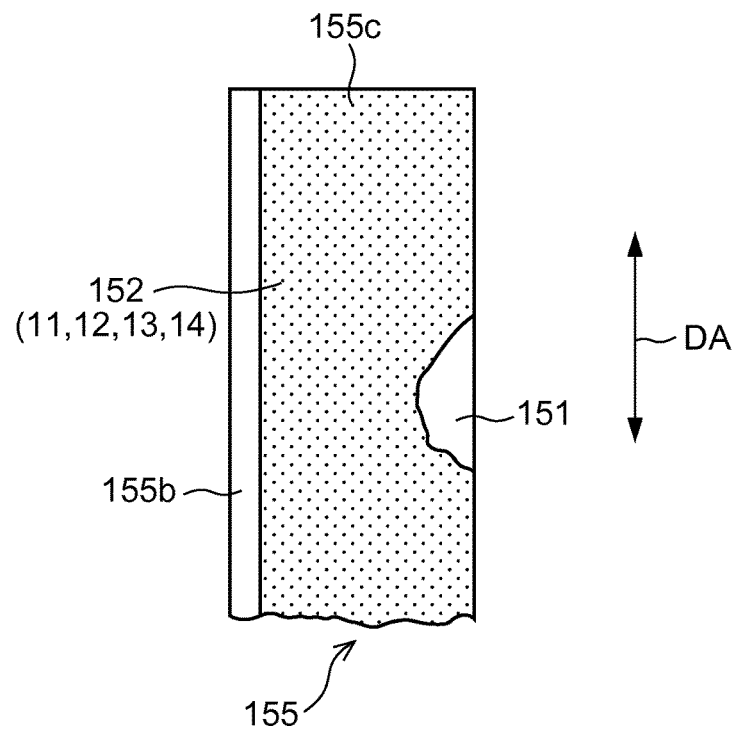
FIG. 3 is a view illustrating a configuration of a positive electrode.

As illustrated in FIG. 3, the positive electrode 155 has a belt shape extending in a longitudinal direction DA, and includes a positive-electrode current collector member 151 made of an aluminum foil, and two positive electrode mixture layers 152 placed on both surfaces of the positive-electrode current collector member 151 so as to have a belt shape extending in the longitudinal direction DA. The positive electrode mixture layer 152 contains a positive-electrode active material 11, a conductive material 12 made of acetylene black, a binder 13 made of PVDF, and lithium phosphate 14.

That part of the positive electrode 155 to which the positive electrode mixture layer 152 is applied is called a positive-electrode-mixture-layer coated part 155c. Meanwhile, that part of the positive electrode 155 which is constituted by only the positive-electrode current collector member 151 without the positive electrode mixture layer 152 is called a positive-electrode-mixture-layer uncoated part 155b. The positive-electrode-mixture-layer uncoated part 155b extends in a belt shape in the longitudinal direction DA of the positive electrode 155 along one long side of the positive electrode 155. The positive-electrode-mixture-layer uncoated part 155b is wound so as to form a spiral shape, and is placed in one end (a left end in FIG. 2) of the electrode body 150 in its axis direction (a right-left direction in FIG. 2). The positive terminal 120 is welded to the positive-electrode-mixture-layer uncoated part 155b.

Note that, in the present embodiment, a lithium nickel manganese oxide (more specifically, $LiNi_{0.5}Mn_{1.5}O_4$) having a spinel structure is used as the positive-electrode active material 11. The positive-electrode active material 11 is a positive-electrode active material having an operation upper limit potential of 4.35 V or more on the metallic lithium basis. That is, the positive-electrode active material 11 is a positive-electrode active material in which an oxidation-reduction potential (an operation potential) of the positive-electrode active material 11 is 4.35 V (vs.Li/Li$^+$) or more within a range where an SOC of the nonaqueous electrolyte secondary battery 100 is 0% to 100%. Accordingly, the nonaqueous electrolyte secondary battery 100 including the positive-electrode active material 11 has a region where a potential of the positive electrode 155 (equivalent to the potential of the positive-electrode active material 11) is 4.35 V (vs.Li/Li$^+$) or more within the range where the SOC is 0% to 100%. In the present embodiment, an average particle diameter of the positive-electrode active material 11 is d50=5 μm.

Figure 4:
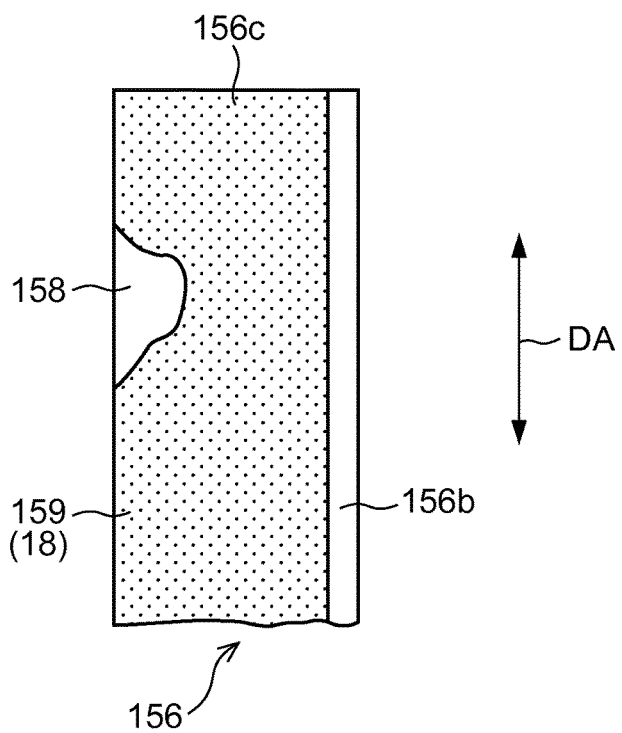
FIG. 4 is a view illustrating a configuration of a negative electrode.

Further, As illustrated in FIG. 4, the negative electrode 156 has a belt shape extending in a longitudinal direction DA, and includes a negative-electrode current collector member 158 made of a copper foil, and two negative electrode mixture layers 159 placed on both surfaces of the negative-electrode current collector member 158 so as to have a belt shape extending in the longitudinal direction DA. The negative electrode mixture layer 159 contains a negative-tive-electrode active material 18, and a binder made of PVDF. Note that, in the present embodiment, a carbon material (more specifically, graphite) is used as the negative-electrode active material 18.

That part of the negative electrode 156 to which the negative electrode mixture layer 159 is applied is called a negative-electrode-mixture-layer coated part 156c. Meanwhile, that part of the negative electrode 156 which is constituted by only the negative-electrode current collector member 158 without the negative electrode mixture layer 159 is called a negative-electrode-mixture-layer uncoated part 156b. The negative-electrode-mixture-layer uncoated part 156b extends in a belt shape in the longitudinal direction DA of the negative electrode 156 along one long side of the negative electrode 156. The negative-electrode-mixture-layer uncoated part 156b is wound so as to form a spiral shape, and is placed in the other end (a right end in FIG. 2) of the electrode body 150 in the axis direction. The negative terminal 130 is welded to the negative-electrode-mixture-layer uncoated part 156b.

The separator 157 is a separator made of a resin film having an electric insulation property. The separator 157 is provided between the positive electrode 155 and the negative electrode 156 so as to separate them from each other. Note that the separator 157 is impregnated with a nonaqueous electrolyte 140.

Further, in the present embodiment, a nonaqueous electrolyte containing a compound having elemental fluorine (F) is used as the nonaqueous electrolyte 140. More specifically, a nonaqueous electrolyte configured such that lithium hexafluorophosphate ($LiPF_6$), which is a compound having elemental fluorine, is dissolved in a nonaqueous solvent in which EC (ethylene carbonate), DMC (dimethyl carbonate), and EMC (ethylmethyl carbonate) are mixed is used.

Figure 5:
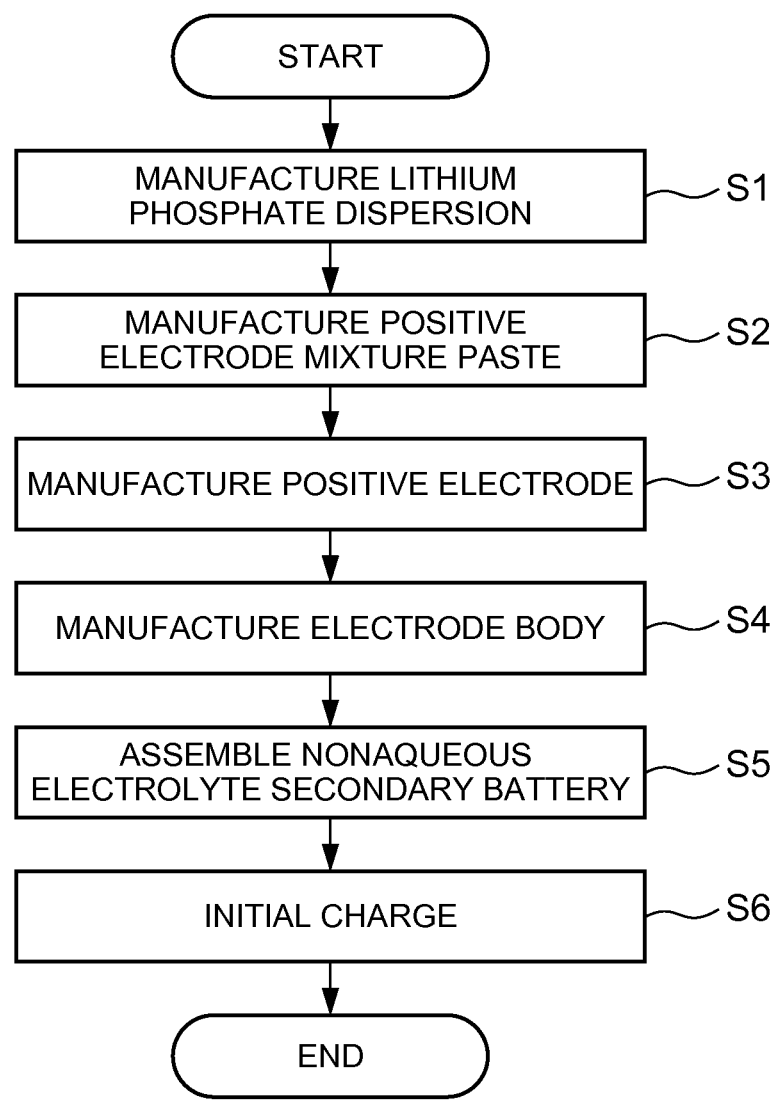
FIG. 5 is a flowchart illustrating a flow of a manufacturing method of a nonaqueous electrolyte secondary battery according to the embodiment.
Figure 6:
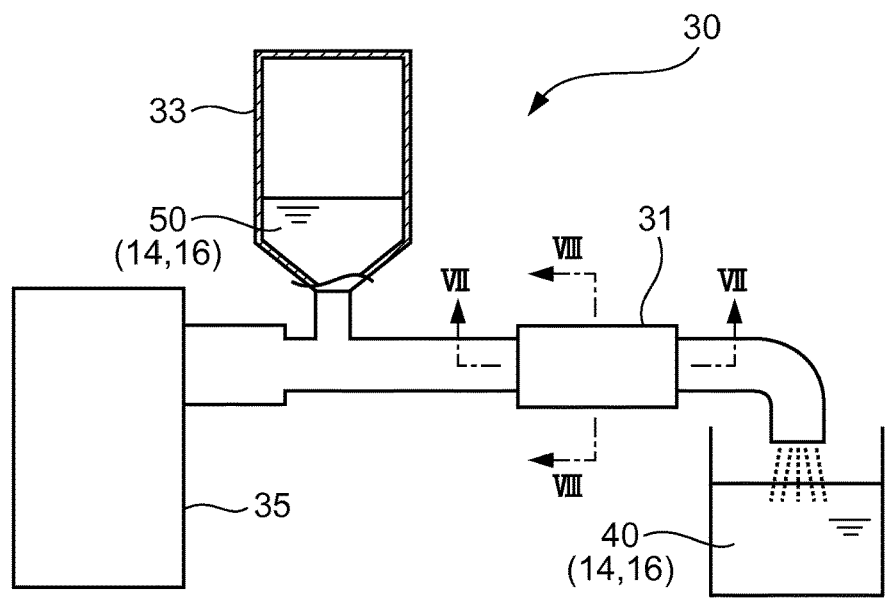
FIG. 6 is a view to describe the manufacturing method of the battery.
Figure 7:
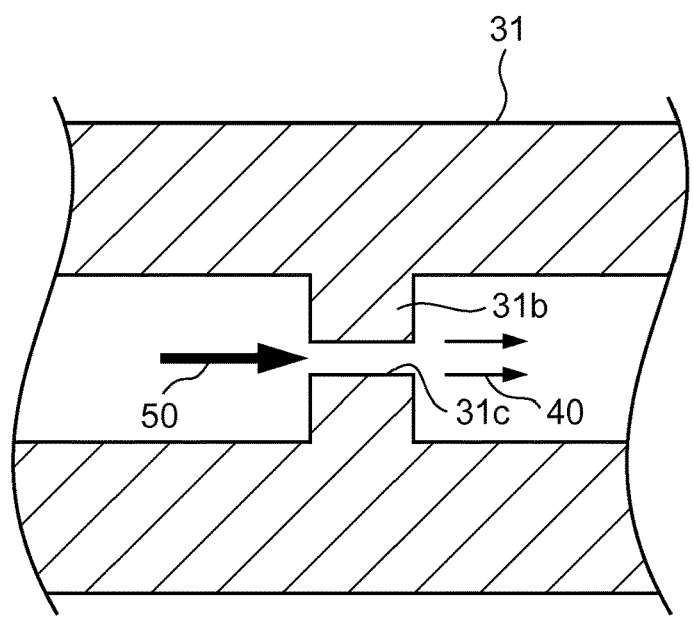
FIG. 7 is a sectional view taken along an arrow VII-VII in FIG. 6.

Next will be described a manufacturing method of a nonaqueous electrolyte secondary battery according to the present embodiment. FIG. 5 is a flowchart illustrating a flow of a manufacturing method of a nonaqueous electrolyte secondary battery according to the present embodiment. First, in step S1 (a lithium phosphate dispersion manufacturing step), a lithium phosphate dispersion 40 is manufactured. More specifically, as illustrated in FIG. 6, with the use of a wet jet mill 30, a lithium phosphate dispersion 40 in which lithium phosphate 14 is dispersed in a solvent 16 (NMP) is manufactured. The wet jet mill 30 is a device including a tank 33 for storing therein a mixture 50 obtained by mixing the lithium phosphate 14 with the solvent 16 (NMP), a pump 35 for pressurizing the mixture 50 to send it out to a nozzle 31, and the nozzle 31 including a liquid passage portion 31b (see FIG. 7) therein.

Due to an operation of the wet jet mill 30, the mixture 50 stored in the tank 33 and configured such that only the lithium phosphate 14 and the solvent 16 (NMP) are mixed (roughly mixed by stirring or the like) is pressurized by the pump 35 and sent into the nozzle 31 at a high speed, so that the mixture 50 is passed through a through hole 31c (see FIG. 7) of the liquid passage portion 31b placed inside the nozzle 31 (a step of performing this processing is called a passing step, and is a part of step S1). When the mixture 50 is passed through the through hole 31c of the liquid passage portion 31b, a shearing force acts on the aggregated lithium phosphate 14, so that the aggregated lithium phosphate 14 is crushed (further, primary particles of the lithium phosphate 14 is ground to be pulverized). Hereby, the lithium phosphate dispersion 40 in which the lithium phosphate 14 is dispersed in the solvent 16 (NMP) is obtained (see FIG. 6).

Figure 10:
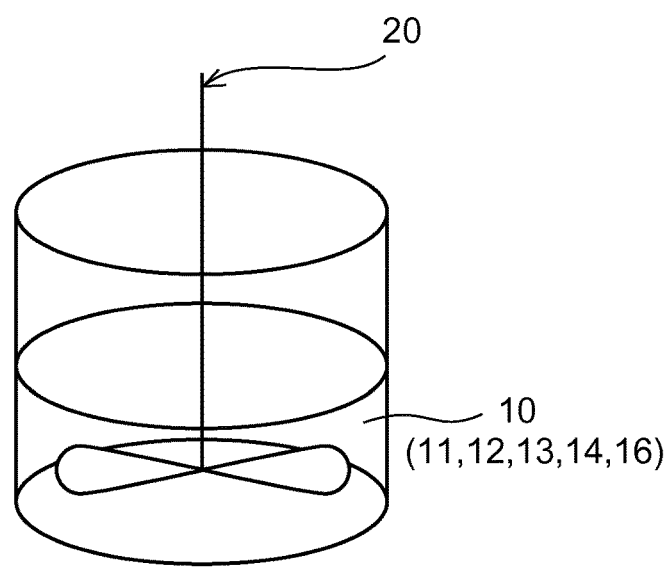
FIG. 10 is another view to describe the manufacturing method of the battery.

Then, the process proceeds to step S2 (a positive electrode mixture paste manufacturing step), and a positive electrode mixture paste 10 is manufactured. More specifically, the positive electrode mixture paste 10 is formed by adding, into the lithium phosphate dispersion 40 (the lithium phosphate 14 and the solvent 16), a positive-electrode active material 11 ($LiNi_{0.5}Mn_{1.5}O_4$), a conductive material 12 (acetylene black), a binder 13 (PVDF), and a dispersing agent, and kneading them by a high-speed disperser 20 (see FIG. 10). Note that, in the present embodiment, HOMOGENIZING MIXER made by PRIMIX Corporation is used as the high-speed disperser 20. Further, a rotation speed of the high-speed disperser 20 is adjusted within a range of 2000 to 4000 rpm, and the kneading is performed for 10 minutes.

Subsequently, the process proceeds to step S3, in which a positive electrode 155 is manufactured. More specifically, the positive electrode mixture paste 10 manufactured as described above is applied to a surface (either side) of a positive-electrode current collector member 151 (an aluminum foil), dried, and then subjected to press working. Hereby, the positive electrode 155 including a positive electrode mixture layer 152 on the surface (either side) of the positive-electrode current collector member 151 is obtained. Note that the positive electrode mixture layer 152 is obtained by drying and pressing (compressing) the positive electrode mixture paste 10.

Next, the process proceeds to step S4, in which an electrode body 150 is manufactured. More specifically, a separator 157 is provided between the positive electrode 155 manufactured as described above and a negative electrode 156 manufactured separately, and they are wound to manufacture the electrode body 150. More specifically, a positive-electrode-mixture-layer uncoated part 155b of the positive electrode 155 and a negative-electrode-mixture-layer uncoated part 156b of the negative electrode 156 are placed on opposite sides to each other along a width direction (the right-left direction in FIGS. 2 to 4). Then, the positive electrode 155, the negative electrode 156, and the separator 157 are wound in a flat shape, so as to manufacture the electrode body 150.

Subsequently, the process proceeds to step S5, in which a nonaqueous electrolyte secondary battery 100 is assembled. More specifically, first, a positive terminal 120 is joined (welded) to the positive-electrode-mixture-layer uncoated part 155b of the electrode body 150. Further, a negative terminal 130 is joined (welded) to the negative-electrode-mixture-layer uncoated part 156b of the electrode body 150. Subsequently, as illustrated in FIG. 2, the electrode body 150 to which the positive terminal 120 and the negative terminal 130 are welded is placed in a receptacle portion 119 of a laminated film 101. Then, the laminated film 101 is folded at its folding position 110g, so as to accommodate the electrode body 150 therein.

After that, a welding sealing portion 115 is heated while being pressurized in its thickness direction, so that inner resin films 111 are welded thermally, and hereby, a battery outer case 110 is formed. Subsequently, a nonaqueous electrolyte 140 is poured into the battery outer case 110 via an injection opening (not shown) provided in the battery outer case 110, and after that, the injection opening is sealed. Thus, assembling of the nonaqueous electrolyte secondary battery 100 is completed.

Subsequently, the process proceeds to step S6, in which initial charge is performed on the nonaqueous electrolyte secondary battery 100 thus assembled. More specifically, the nonaqueous electrolyte secondary battery 100 is charged until its SOC reaches 100%. By performing initial charge as such, an oxidation-reduction potential (an operation potential) of the positive-electrode active material 11 reaches 4.35 V (vs.$Li/Li^+$) or more. After that, predetermined processing is performed, so that the nonaqueous electrolyte secondary battery 100 is completed.

In the meantime, in the present embodiment, in step S1 (the lithium phosphate dispersion manufacturing step), the lithium phosphate dispersion 40 (a liquid in which the lithium phosphate 14 is dispersed in the solvent 16) is manufactured by dispersing the lithium phosphate 14 in the solvent 16 without adding the positive-electrode active material 11, as described above. After that, in step S2 (the positive electrode mixture paste manufacturing step), the positive electrode mixture paste 10 is manufactured by mixing the lithium phosphate dispersion 40 thus manufactured earlier, with a positive electrode material (the positive-electrode active material 11, the conductive material 12, and the binder 13) including the positive-electrode active material 11.

As such, in the present embodiment, in order to manufacture the positive electrode mixture paste 10, the lithium phosphate dispersion 40 is initially manufactured in step S1 (the lithium phosphate dispersion manufacturing step) by dispersing (performing a process of dispersing) the lithium phosphate 14 in the solvent 16 without adding the positive-electrode active material 11. Thus, by performing the process (a dispersion process by use of the wet jet mill 30) of dispersing the lithium phosphate 14 in the solvent 16 without including the positive-electrode active material 11, no crack of the positive-electrode active material 11 occurs in the dispersion process. On this account, in step S1 (the lithium phosphate dispersion manufacturing step), the ability of the dispersion process can be raised to such an extent that a good dispersion degree of the lithium phosphate 14 can be achieved. In other words, the dispersion degree of the lithium phosphate 14 in the solvent 16 can be raised without causing cracks of the positive-electrode active material 11.

More specifically, in the present embodiment, in step S1 (the lithium phosphate dispersion manufacturing step), the lithium phosphate 14 is dispersed in the solvent 16 with the use of the wet jet mill 30 (see FIG. 6). More specifically, the passing step of pressurizing, by the pump 35, the mixture 50 obtained by mixing only the lithium phosphate 14 and the solvent 16, so as to send the mixture 50 into the nozzle 31 at a high speed and to pass the mixture 50 through the through hole 31c (see FIG. 7) penetrating through the liquid passage portion 31b placed in the nozzle 31 is performed.

Figure 8:
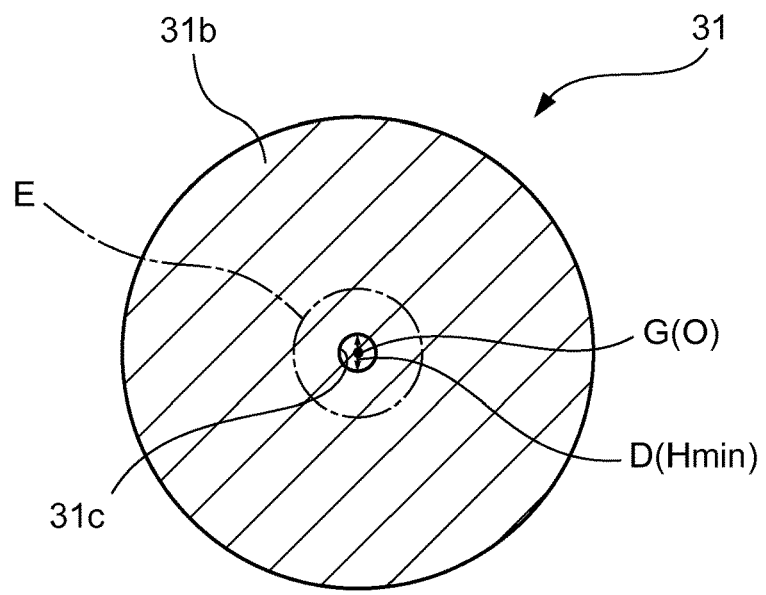
FIG. 8 is a sectional view taken along an arrow VIII-VIII in FIG. 6.
Figure 9:
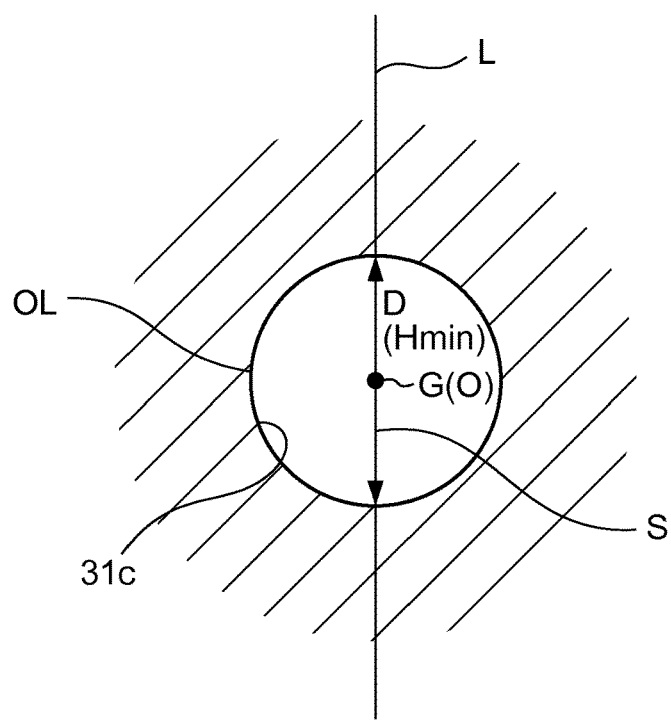
FIG. 9 is an enlarged view of a part E in FIG. 8.

Particularly, in the present embodiment, as illustrated in FIGS. 8 and 9, among those dimensions of the through hole 31c which are defined by lengths of segments S (segments S placed inside an outside line OL of the through hole 31c) obtained by cutting, by the outside line OL, straight lines L passing through a centroid G (a center O) of a pattern (a circle) indicated by the outside line OL on a cut surface (a cut surface as illustrated in FIGS. 8 and 9) obtained by cutting the liquid passage portion 31b along a direction perpendicular to a direction (a left-right direction in FIGS. 6 and 7) in which the through hole 31c of the liquid passage portion 31b extends, the minimum dimension Hmin of the through hole 31c which corresponds to a length of a shortest segment S is 200 μm or less. Note that, in the present embodiment, since the through hole 31c of the liquid passage portion 31b has a circular shape (a cylindrical shape), each segment S corresponds to a diameter of the circle, so that the minimum dimension Hmin of the through hole 31c corresponds to a diameter D of the circle. Accordingly, in the present embodiment, the diameter D (an inside diameter) of the through hole 31c of the liquid passage portion 31b is set to 200 µm or less.

As such, the minimum dimension Hmin (the minimum dimension Hmin at a position passing through the centroid G) of the through hole 31c of the liquid passage portion 31b is set to 200 µm or less. Hereby, when the mixture 50 in which the lithium phosphate 14 is mixed with the solvent 16 passes through the through hole 31c, a shearing force can be applied to particles of the aggregated lithium phosphate 14, appropriately. Accordingly, when the mixture 50 in which the lithium phosphate 14 is mixed with the solvent 16 passes through the through hole 31c, the aggregated lithium phosphate 14 can be crushed appropriately (besides, primary particles of the lithium phosphate 14 can be partially ground to be pulverized). Hereby, the lithium phosphate dispersion 40 with a good dispersion degree of the lithium phosphate 14 can be manufactured.

After that, in step S2 (the positive electrode mixture paste manufacturing step), the lithium phosphate dispersion 40 with a good dispersion degree of the lithium phosphate 14 is mixed with a positive electrode material including the positive-electrode active material 11, so that the positive electrode mixture paste 10 with a good dispersion degree of the lithium phosphate 14 can be manufactured. As a result, in the positive electrode mixture layer 152 formed by drying the positive electrode mixture paste 10, a good dispersion degree of the lithium phosphate 14 can be obtained.

Hereby, in the step (step S6) of performing initial charge on the nonaqueous electrolyte secondary battery 100, "when a potential of the positive-electrode active material 11 (equivalent to a potential of the positive electrode 155) reaches 4.35 V or more, so that the solvent (ethylene carbonate and the like) in the nonaqueous electrolyte 140 is decomposed by oxidation on a surface of the positive-electrode active material 11 and hydrogen ions generated hereby are reacted with fluorine ions in the nonaqueous electrolyte 140 so as to generate hydrofluoric acid (HF)," a probability that the hydrofluoric acid thus generated is reacted with the lithium phosphate 14 can be increased, thereby making it possible to effectively reduce the hydrofluoric acid thus generated. As a result, it is possible to reduce elution of transition metals (Mn) in the positive-electrode active material 11 due to an action of the hydrofluoric acid. Note that that part of the hydrofluoric acid thus generated which cannot be reacted with the lithium phosphate 14 on the surface of the positive-electrode active material 11 migrates to the negative electrode 156, and generates hydrogen gas ($H_2$).

Further, due to the reaction between the hydrofluoric acid and the lithium phosphate 14 on the surface of the positive-electrode active material 11, a protective coating (which is presumably a coating in which a compound having elemental fluorine is mixed with a compound having elemental phosphorus) is formed on the surface of the positive-electrode active material 11. In the present embodiment, a good dispersion degree of the lithium phosphate 14 in the positive electrode mixture layer 152 can be obtained, so that the protective coating is easily formed on the surface of each positive-electrode active material 11 in the positive electrode mixture layer 152. Since the protective surface film is formed, in a case where the nonaqueous electrolyte secondary battery 100 is charged subsequently until the potential of the positive-electrode active material 11 (equivalent to the potential of the positive electrode 155) reaches 4.35 V or more, it is possible to restrain the solvent of the nonaqueous electrolyte 140 from being decomposed by oxidation on the surface of the positive-electrode active material 11. Hereby, it is possible to restrain elution of transition metals (Mn) from the positive-electrode active material 11.

(Evaluation Test of Minimum Dimension of Through Hole of Liquid Passage Portion) Here, a preferable range of the minimum dimension Hmin (the diameter D) of the through hole 31c of the liquid passage portion 31b was examined. More specifically, three different nozzles 31 were prepared such that respective through holes 31c of respective liquid passage portions 31b had minimum dimensions Hmin (diameters D) of 100 µm, 200 µm, and 300 µm, and with the use of wet jet mills 30 to which respective nozzles 31 were attached, lithium phosphate dispersions 40 were manufactured. Note that, in this test, a temperature of a mixture 50 in a tank 33 of each of the wet jet mills 30 was 25° C. Further, an applied pressure to the mixture 50 by a pump 35 was 200 MPa.

Then, in order to evaluate a dispersion degree of lithium phosphate 14 in each of the lithium phosphate dispersions 40 thus manufactured, grindability of the lithium phosphate was calculated. Note that the grindability of the lithium phosphate was calculated according to Calculation Equation (1) as follows:

$$\text{Grindability} = (B - A \cap B)/B \qquad (1)$$

Figure 13:
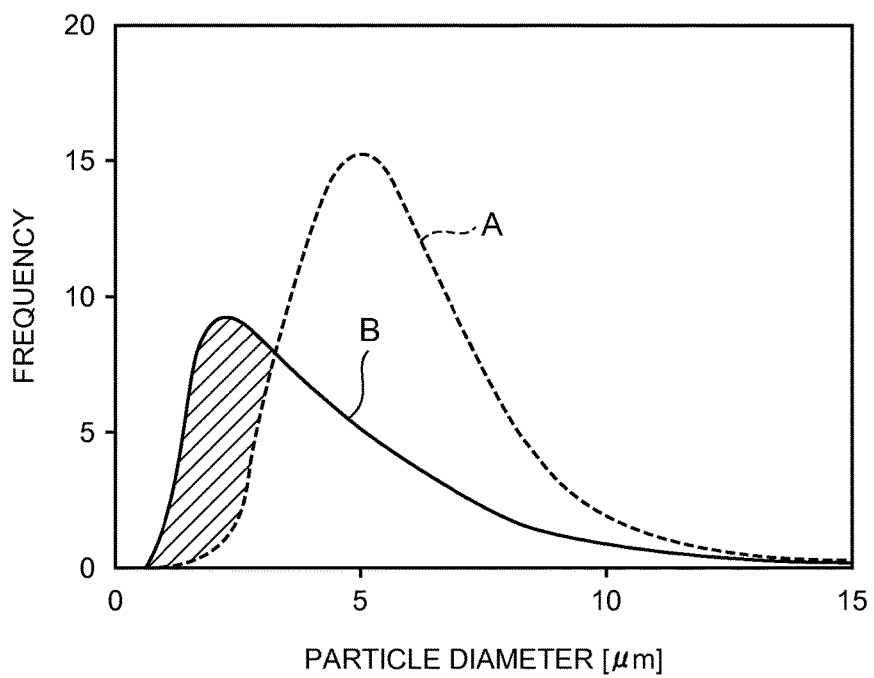
FIG. 13 is a view to describe grindability of lithium phosphate.

Here, A indicates an area of a region surrounded by a horizontal axis and a curved line (a curved line indicated by a broken line in FIG. 13) indicative of a particle size distribution of lithium phosphate 14 included in a mixture 50 in which the lithium phosphate 14 is roughly mixed with a solvent 16. In the meantime, B indicates an area of a region surrounded by the horizontal axis and a curved line (a curved line indicated by a continuous line in FIG. 13) indicative of a particle size distribution of lithium phosphate 14 included in a lithium phosphate dispersion 40 manufactured by passing the mixture 50 through the through hole 31c of the liquid passage portion 31b. The particle size distribution B fluctuates depending on the ability to crush (grind) the lithium phosphate 14. (B−A∩B) indicates an area of a region indicated by hatching in FIG. 13.

It can be said that, as a value of the grindability is larger, the ability to crush (grind) the lithium phosphate 14 by passing the mixture 50 through the through hole 31c is higher, and a dispersion degree of the lithium phosphate 14 in the lithium phosphate dispersion 40 is also higher. Note that the horizontal axis of FIG. 13 indicates a particle diameter of the lithium phosphate 14 (µm), and a vertical axis indicates a frequency thereof.

Figure 12:
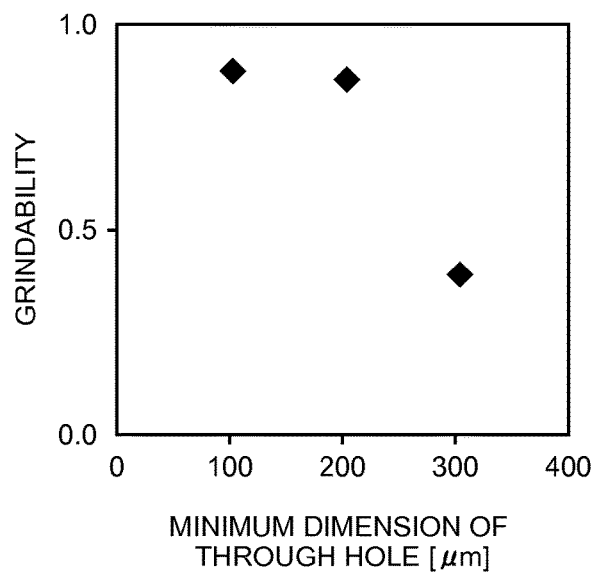
FIG. 12 is a correlation diagram between a minimum dimension of a through hole of a liquid passage portion and grindability of lithium phosphate.

FIG. 12 illustrates a correlation diagram between the minimum dimension Hmin (the diameter D) of the through hole 31c of the liquid passage portion 31b and that grindability of the lithium phosphate which was calculated as described above. From FIG. 12, it is found that, as the minimum dimension Hmin (the diameter D) of the through hole 31c of the liquid passage portion 31b is made smaller, a value of the grindability of the lithium phosphate becomes higher. More specifically, in a case where the minimum dimension Hmin (the diameter D) of the through hole 31c of the liquid passage portion 31b was 100 µm or 200 µm, the grindability of the lithium phosphate could be made extremely high in comparison with a case of 300 µm. From this result, it is preferable that the minimum dimension Hmin (the diameter D) of the through hole 31c of the liquid passage portion 31b be set to 200 µm or less.

It can be said that, by setting the minimum dimension Hmin (the diameter D) of the through hole 31c of the liquid passage portion 31b to 200 μm or less, when the mixture 50 in which the lithium phosphate 14 is mixed with the solvent 16 passes through the through hole 31c, a shearing force can be applied to particles of the aggregated lithium phosphate 14, appropriately. Accordingly, it can be said that, when the mixture 50 in which the lithium phosphate 14 is mixed with the solvent 16 passes through the through hole 31c with a minimum dimension Hmin (the diameter D) of 200 μm or less, the aggregated lithium phosphate 14 can be crushed appropriately (besides, primary particles of the lithium phosphate 14 can be partially ground to be pulverized). Hereby, it can be said that the lithium phosphate dispersion 40 with a good dispersion degree of the lithium phosphate 14 can be manufactured.

(Evaluation Test of Pressure to be Added to Mixture) Subsequently, a preferable range of a pressure to be applied to the mixture 50 was examined. More specifically, lithium phosphate dispersions 40 were manufactured by setting an applied pressure to the mixture 50 by the pump 35 of the wet jet mill 30, to different pressures of 0.1 MPa, 5 MPa, 50 MPa, and 200 MPa. Note that, in this test, a temperature of the mixture 50 in the tank 33 of the wet jet mill 30 was 25° C. Further, a minimum dimension Hmin (a diameter D) of the through hole 31c of the liquid passage portion 31b was 100 μm or less.

Then, in order to evaluate a dispersion degree of lithium phosphate 14 in each of the lithium phosphate dispersions 40 thus manufactured, an average particle diameter (d50) of the lithium phosphate included in the each of the lithium phosphate dispersions 40 was calculated. It can be said that, as a value of the average particle diameter (d50) of the lithium phosphate is smaller, the ability to crush (grind) the lithium phosphate 14 by passing the mixture 50 through the through hole 31c is higher, and the dispersion degree of the lithium phosphate 14 in the lithium phosphate dispersion 40 is also higher.

Figure 14:
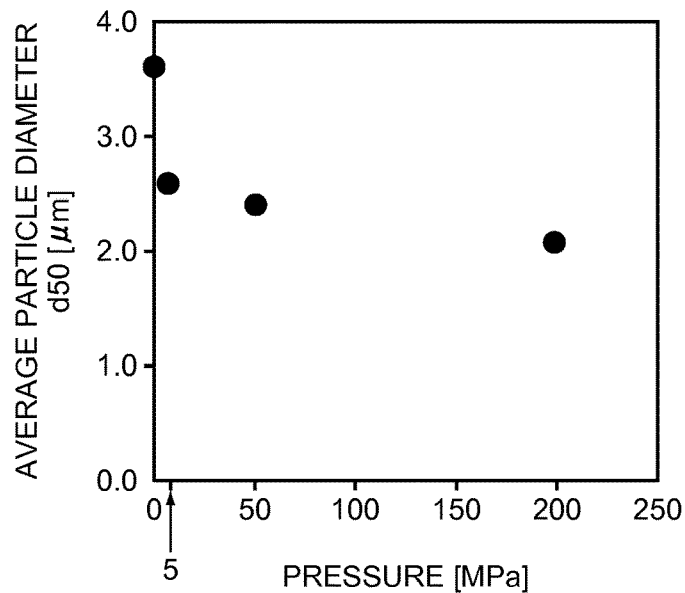
FIG. 14 is a correlation diagram between a pressure to be applied to a mixture and a particle diameter of lithium phosphate.

Here, a correlation diagram between the pressure to be applied to the mixture 50 and that average particle diameter (d50) of the lithium phosphate which is calculated as described above is illustrated in FIG. 14. From FIG. 14, it is found that, as the pressure to be applied to the mixture 50 is increased, the average particle diameter (d50) of the lithium phosphate can be made smaller. More specifically, it can be said that, when the pressure to be applied to the mixture 50 is set to 5 MPa or more, the average particle diameter (d50) of the lithium phosphate can be made smaller effectively. From this result, it can be said that the pressure to be applied to the mixture 50 is set preferably to 5 MPa or more. Note that, in this test, lithium phosphate made of a powdery material having an average particle diameter (d50) of 3 μm is used as the lithium phosphate 14.

By applying a pressure of 5 MPa or more to the mixture 50, a flow speed of the mixture 50 passing through the through hole 31c can be raised. Accordingly, it can be said that a large shearing force can be applied to lithium phosphate particles 14 passing through the through hole 31c. Hereby, the aggregated lithium phosphate particles 14 can be crushed effectively (besides, primary particles of the lithium phosphate 14 can be partially ground to be pulverized). Accordingly, it can be said that, by applying a pressure of 5 MPa or more to the mixture 50, the lithium phosphate dispersion 40 with a further preferable dispersion degree (a high dispersion degree) of the lithium phosphate 14 can be manufactured.

(Evaluation Test of Temperature of Mixture) Subsequently, a preferable range of a temperature of the mixture 50 was examined. More specifically, lithium phosphate dispersions 40 were manufactured with different temperatures of the mixture 50 in the tank 33 of the wet jet mill 30, which different temperatures were 25° C., 50° C., and 100° C. Note that, in this test, a minimum dimension Hmin (a diameter D) of the through hole 31c of the liquid passage portion 31b of the wet jet mill 30 was 100 μm. Further, an applied pressure to the mixture 50 by the pump 35 was 50 MPa.

Then, in order to evaluate a dispersion degree of lithium phosphate 14 in each of the lithium phosphate dispersions 40 thus manufactured, a dissolution amount (a weight of the liquid lithium phosphate) of the lithium phosphate per 1 g of the solvent 16 was measured in terms of the each of the lithium phosphate dispersions 40. As the dissolution amount of lithium phosphate (the weight of dissolved lithium phosphate) was larger, dispersibility of the lithium phosphate in the lithium phosphate dispersion 40 can be raised.

Figure 15:
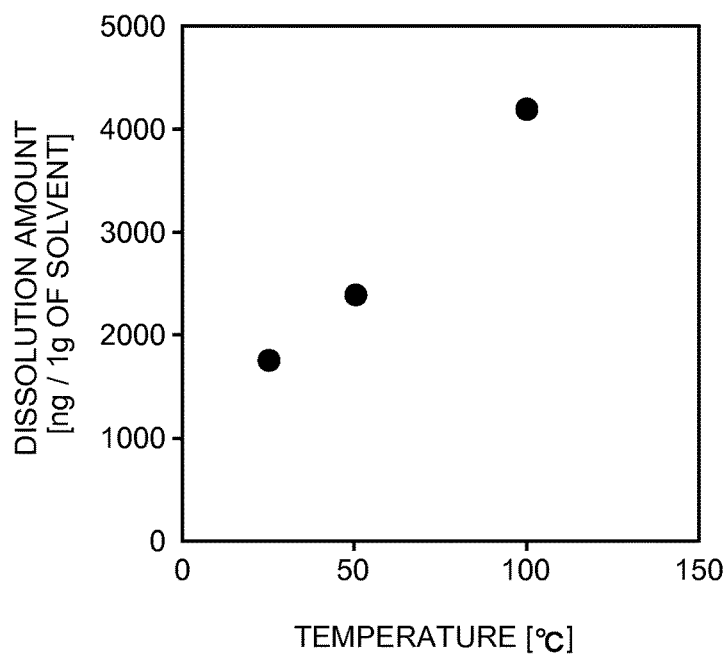
FIG. 15 is a correlation diagram between a temperature of the mixture and a dissolution amount of lithium phosphate.

Here, a correlation diagram between the temperature of the mixture 50 and that dissolution amount of the lithium phosphate which was measured as described above is illustrated in FIG. 15. From FIG. 15, it is found that, as the temperature of the mixture 50 is made higher, the dissolution amount of the lithium phosphate (the weight of the dissolved lithium phosphate) can be made larger. More specifically, it can be said that, when the temperature of the mixture 50 is set to 50° C. or more, the dissolution amount of the lithium phosphate (the weight of the dissolved lithium phosphate) can be made larger effectively.

Example 1

In Example 1, in step S1, a lithium phosphate dispersion 40 was manufactured under the following conditions. More specifically, a minimum dimension Hmin of a through hole 31c of a liquid passage portion 31b was set to 100 μm. That is, a diameter D (an inside diameter) of the through hole 31c of the liquid passage portion 31b was set to 100 μm. Further, a temperature of a mixture 50 in a tank 33 was set to 25° C. Further, an applied pressure to the mixture 50 by a pump 35 was set to 50 MPa. A nonaqueous electrolyte secondary battery 100 was assembled by use of the lithium phosphate dispersion 40 manufactured under the aforementioned conditions.

Example 2

In Example 2, a lithium phosphate dispersion 40 was manufactured by setting a temperature of a mixture 50 in a tank 33 was set to 50° C. in step S1, which is an only difference from Example 1. A nonaqueous electrolyte secondary battery 100 was assembled by use of the lithium phosphate dispersion 40 manufactured under such conditions.

Comparative Example 1

In Comparative Example 1, under a temperature environment of 25° C., a positive electrode mixture paste was manufactured such that a positive-electrode active material 11, a conductive material 12, a binder 13, lithium phosphate 14, a solvent 16, and a dispersing agent were kneaded at the same time by a high-speed disperser 20. Note that, in Comparative Example 1, a kneading energy (a rotation speed) of the high-speed disperser 20 was adjusted so that the positive-electrode active material 11 was not broken at the time of kneading. More specifically, a rotation speed of the high-speed disperser 20 was adjusted within a range of 2000 to 4000 rpm, so as to perform kneading for 10 minutes. A nonaqueous electrolyte secondary battery was assembled by use of the positive electrode mixture paste manufactured under such conditions.

(Evaluation Test) Subsequently, a test to evaluate a dispersion degree of lithium phosphate in a positive electrode mixture layer was performed in terms of the nonaqueous electrolyte secondary batteries of Examples 1, 2 and Comparative Example 1. Initially, respective volumes (before initial charge) of the nonaqueous electrolyte secondary batteries of Examples 1, 2 and Comparative Example 1 were measured. Subsequently, initial charge was performed on respective nonaqueous electrolyte secondary batteries. Note that a method of the initial charge is the same as step S6 described above. After that, respective volumes (volumes after initial charge) of the nonaqueous electrolyte secondary batteries were measured. Then, in terms of each of the nonaqueous electrolyte secondary batteries, the volume before initial charge was subtracted from the volume after initial charge, so as to calculate a volume increasing amount due to initial charge.

Here, it can be considered that a volume increasing amount due to initial charge is equal to a gas generation amount due to initial charge. This is because each battery outer case was made of a laminated film, and when gas is generated in the battery outer case, a volume of the battery increases by just that much (just by a gas generation amount). On this account, the volume increasing amount due to initial charge was regarded as a gas generation amount due to initial charge, and a gas generation amount due to initial charge was found for each battery. Results thereof are illustrated in FIG. 11.

Note that it can be said that, as a gas generation amount due to initial charge is smaller, the battery has a higher dispersion degree of lithium phosphate in the positive electrode mixture layer. The reason is as follows: the battery with a higher dispersion degree of lithium phosphate in the positive electrode mixture layer has a higher probability that hydrofluoric acid generated by performing initial charge (so that a potential of the positive-electrode active material 11 reaches 4.35 V or more, more specifically) is to be reacted with lithium phosphate, thereby making it possible to more effectively reduce the hydrofluoric acid thus generated. This makes it possible to further reduce such a reaction that fluorinated acid that cannot be reacted with lithium phosphate migrates to a negative electrode and generates hydrogen gas.

Figure 11:
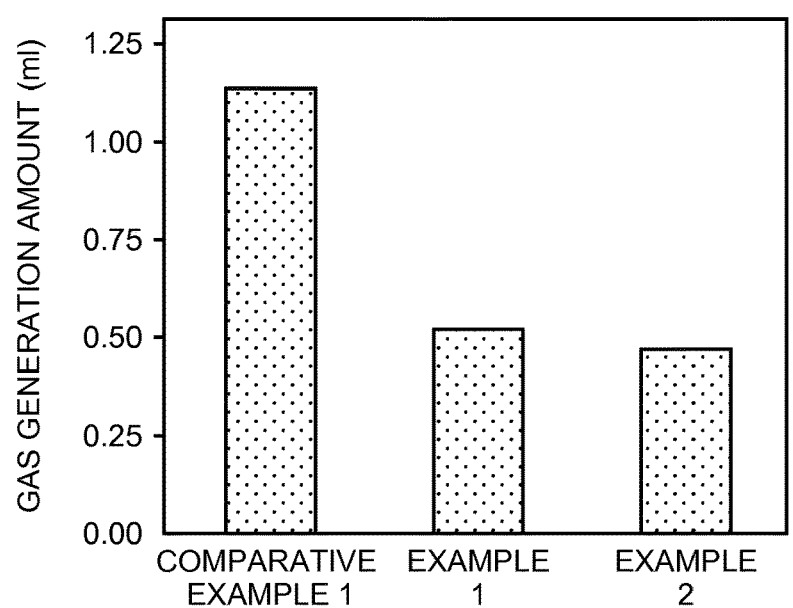
FIG. 11 is a view to compare gas generation amounts after initial charge.

In view of this, from consideration of the results of FIG. 11, it was found that the battery in Comparative Example 1 had a largest gas generation amount (more specifically, a gas generation amount was 1.13 ml). The reason is as follows: in Comparative Example 1, the positive electrode mixture paste was manufactured such that the positive-electrode active material 11, the conductive material 12, the binder 13, the lithium phosphate 14, the solvent 16, and the dispersing agent were kneaded at the same time. More specifically, the positive electrode mixture paste was manufactured by limiting a kneading energy (a rotation speed) of the high-speed disperser 20 so that the positive-electrode active material 11 was not broken at the time of kneading. This presumably made it difficult to appropriately disperse the lithium phosphate 14 in the positive electrode mixture paste, thereby resulting in that a dispersion degree of the lithium phosphate in the positive electrode mixture layer was lowered.

In contrast, in the batteries 100 of Examples 1, 2, a gas generation amount could be largely reduced in comparison with Comparative Example 1. More specifically, a gas generation amount in the battery 100 of Example 1 was 0.52 ml and a gas generation amount in the battery 100 of Example 2 was 0.49 ml, and thus, the gas generation amounts could be reduced by about 50% or more from the battery of Comparative Example 1.

The reason is as follows: differently from Comparative Example 1, in Examples 1, 2, the lithium phosphate dispersion 40 (a liquid in which the lithium phosphate 14 is dispersed in the solvent 16) was initially manufactured in step S1 by dispersing the lithium phosphate 14 in the solvent 16 without adding the positive-electrode active material 11. After that, in step S2, the positive electrode mixture paste 10 was manufactured by mixing the lithium phosphate dispersion 40 thus manufactured earlier, with a positive electrode material (the positive-electrode active material 11, the conductive material 12, and the binder 13) including the positive-electrode active material 11.

Thus, by performing the process (a dispersion process by use of the wet jet mill 30) of dispersing the lithium phosphate 14 in the solvent 16 without including the positive-electrode active material 11, no crack of the positive-electrode active material 11 occurs in the dispersion process. Accordingly, in Examples 1, 2, the ability of the dispersion process by the wet jet mill 30 could be raised to such an extent that a good dispersion degree of the lithium phosphate 14 could be achieved.

More specifically, by setting the minimum dimension Hmin (the diameter D) of the through hole 31c of the liquid passage portion 31b to 200 μm or less, when the mixture 50 in which the lithium phosphate 14 was mixed with the solvent 16 passed through the through hole 31c, a shearing force could be applied to particles of the aggregated lithium phosphate 14, appropriately, and the lithium phosphate 14 could be crushed (ground) appropriately. Further, by setting an applied pressure to the mixture 50 by the pump 35 to 5 MPa or more, a flow speed of the mixture 50 passing through the through hole 31c could be raised, so that a large shearing force could be applied to the lithium phosphate particles 14 passing through the through hole 31c, and the lithium phosphate 14 could be crushed (ground) effectively. Hereby, the lithium phosphate dispersion 40 with a good dispersion degree of the lithium phosphate 14 could be manufactured.

After that, the lithium phosphate dispersion 40 with a good dispersion degree of the lithium phosphate 14 was mixed with a positive electrode material including the positive-electrode active material 11, so that the positive electrode mixture paste 10 with a good dispersion degree of the lithium phosphate 14 could be manufactured, thereby resulting in that, in the positive electrode mixture layer 152 formed by drying the positive electrode mixture paste 10, a good dispersion degree of the lithium phosphate 14 could be obtained.

As a result, in the batteries 100 of Examples 1, 2, it can be said that hydrofluoric acid generated on the surface of the positive-electrode active material due to initial charge was reacted with lithium phosphate with high probability, thereby making it possible to effectively reduce the hydrofluoric acid thus generated. Hereby, it can be said that such a reaction that fluorinated acid that cannot be reacted with lithium phosphate migrates to the negative electrode and generates hydrogen gas could be reduced effectively.

Further, in Example 2, the gas generation amount could be reduced in comparison with Example 1. The reason is as follows: when the lithium phosphate dispersion 40 was manufactured, the temperature of the mixture 50 was set to 50° C. in Example 2, whereas the temperature of the mixture 50 was set to 25° C. in Example 1. It can be said that, since the temperature of the mixture in Example 2 was set higher than Example 1, more lithium phosphate could be dissolved in the solvent as compared with Example 1, thereby making it possible to raise dispersibility of the lithium phosphate in the mixture and in the lithium phosphate dispersion. Hereby, it can be said that, in Example 2, the dispersion degree of the lithium phosphate in the positive electrode mixture paste could be raised in comparison with Example 1, and consequently, the dispersion degree of the lithium phosphate could be raised in the positive electrode mixture layer formed by drying the positive electrode mixture paste.

The present invention has been described above in line with the embodiment, but the present invention is not limited to the above embodiment and can be modified and applied appropriately without departing from the gist of the present invention.

For example, in the present embodiment, in step S1 (the lithium phosphate dispersion manufacturing step), the lithium phosphate dispersion 40 is manufactured such that the lithium phosphate 14 is dispersed in the solvent 16 with the use of the wet jet mill 30. More specifically, the mixture 50 obtained by mixing the lithium phosphate 14 and the solvent 16 is passed through the through hole 31c penetrating through the liquid passage portion 31b placed in the nozzle 31, so that the lithium phosphate 14 in the mixture 50 is crushed (ground), thereby manufacturing the lithium phosphate dispersion 40 (see FIGS. 6 and 7).

However, the method of manufacturing the lithium phosphate dispersion is not limited to the above manufacturing method, and may be other methods, provided that lithium phosphate is dispersed in a solvent without adding a positive-electrode active material thereto. For example, the lithium phosphate dispersion 40 may be manufactured such that the solvent 16 and the lithium phosphate 14 are kneaded by use of a well-known high-speed disperser (e.g., HOMOGENIZING MIXER made by PRIMIX Corporation) without adding the positive-electrode active material 11. Note that, differently from the conventional kneading method, in the above kneading method, it is not necessary to limit a kneading energy (a rotation speed or the like) in order to restrain cracks of the positive-electrode active material 11. Accordingly, the kneading energy (the rotation speed or the like) can be raised until a good dispersion degree of the lithium phosphate 14 in the solvent 16 is achieved. Hereby, a lithium phosphate dispersion with a good dispersion degree of lithium phosphate can be manufactured.

Figure 16:
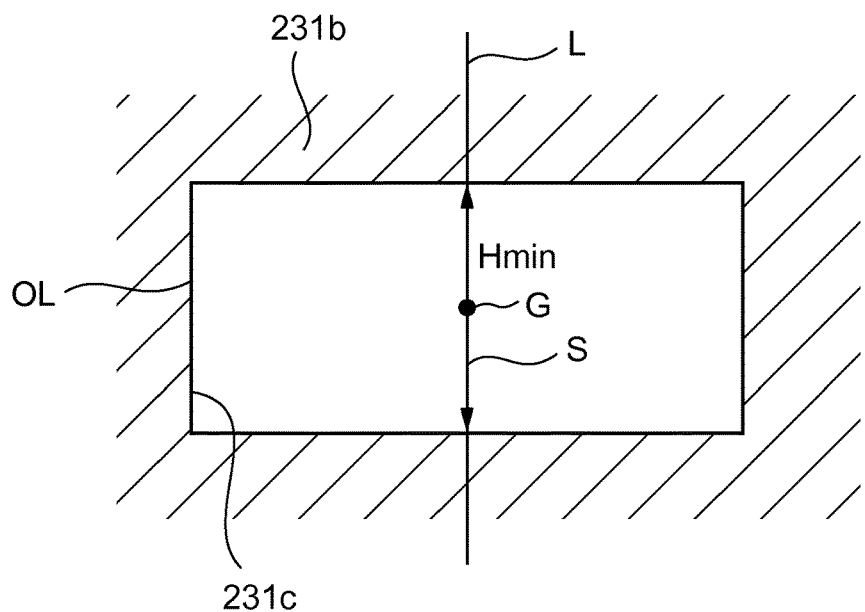
FIG. 16 is a view illustrating another configuration of the through hole of the liquid passage portion and is a sectional view similar to FIG. 9.

Further, in the present embodiment, the shape of the through hole 31c of the liquid passage portion 31b is circular (cylindrical) (see FIGS. 8 and 9). However, the through hole of the liquid passage portion may have any shape. For example, as illustrated in FIG. 16, the through hole of the liquid passage portion may have a rectangular shape (a rectangular cylindrical shape). In this case, among those dimensions of a through hole 231c which are defined by lengths of segments S (segments S placed inside an outside line OL of the through hole 231c) obtained by cutting, by the outside line OL, straight lines L passing through a centroid G of a pattern (a rectangular shape) indicated by the outside line OL on a cut surface (a cut surface illustrated in FIG. 16) obtained by cutting a liquid passage portion 231b along a direction perpendicular to a direction (a direction perpendicular to a plane of paper in FIG. 16) where the through hole 231c of the liquid passage portion 231b extends, the minimum dimension Hmin of the through hole 231c which corresponds to a length of a shortest segment S is preferably 200 μm or less. In this case, a length of the shortest segment S corresponds to a length of a short side of the rectangular shape, so it is preferable that the through hole 231c be formed in a rectangular shape having a short-side length of 200 μm or less.

Figure 17:
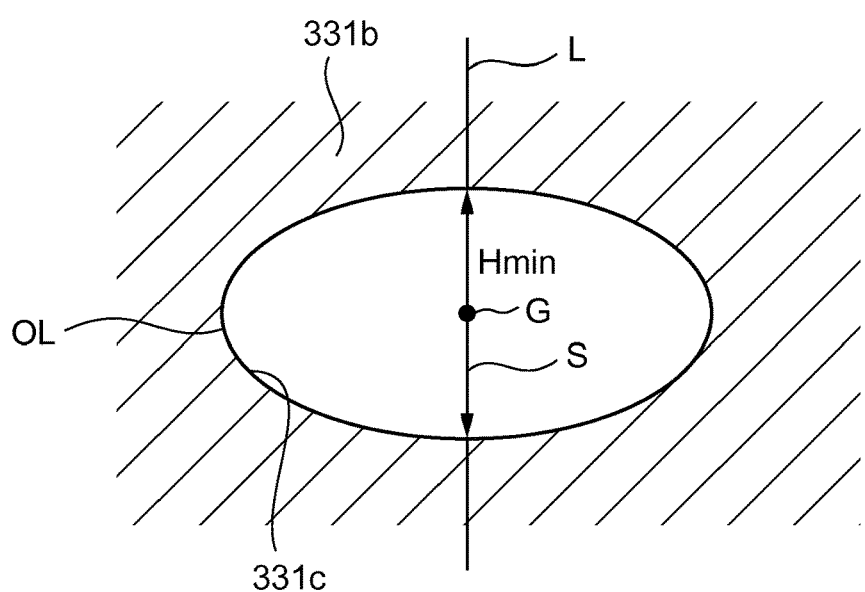
FIG. 17 is a view illustrating another configuration of the through hole of the liquid passage portion and is a sectional view similar to FIG. 9.

Further, as illustrated in FIG. 17, the through hole of the liquid passage portion may have an elliptical shape (an elliptical cylindrical shape). Also in this case, among those dimensions of a through hole 331c which are defined by lengths of segments S (segments S placed inside an outside line OL of the through hole 331c) obtained by cutting, by the outside line OL, straight lines L passing through a centroid G of a pattern (an elliptical shape) indicated by the outside line OL on a cut surface (a cut surface illustrated in FIG. 17) obtained by cutting a liquid passage portion 331b along a direction perpendicular to a direction (a direction perpendicular to a plane of paper in FIG. 17) where the through hole 331c of the liquid passage portion 331b extends, the minimum dimension Hmin of the through hole 331c which corresponds to a length of a shortest segment S is preferably 200 μm or less. Also in this case, a length of the shortest segment S corresponds to a length of a short diameter (a short axis) of the elliptical shape, so it is preferable that the through hole 331c be formed in an elliptical shape having a short-diameter (short-axis) length of 200 μm or less.

What is claimed is:

1. A manufacturing method of a nonaqueous electrolyte secondary battery, the manufacturing method comprising:
    a lithium phosphate dispersion manufacturing step of manufacturing a lithium phosphate dispersion including dispersing step of mixing lithium phosphate with a solvent without adding a positive-electrode active material to obtain a mixture, and a passing step of sending, into a nozzle, the mixture so that the mixture passes through a through hole of a liquid passage portion placed in the nozzle,
    wherein, in the passing step, a temperature of the mixture is 50° C. or more and among those dimensions of the through hole which are prescribed by lengths of segments obtained by cutting, by an outside line of the through hole, straight lines passing through a centroid of a pattern indicated by the outside line on a cut surface obtained by cutting the liquid passage portion along a direction perpendicular to a direction where the through hole extends, the minimum dimension of the through hole which corresponds to a length of a shortest segment is 200 μm or less;
    a positive electrode mixture paste manufacturing step of manufacturing a positive electrode mixture paste by mixing the lithium phosphate dispersion with a positive electrode material including a positive-electrode active material having an operation upper limit potential of 4.35 V or more on a metallic lithium basis;
    a step of manufacturing a positive electrode including a positive electrode mixture layer on a surface of a current collector member by applying the positive electrode mixture paste on the surface of the current collector member and drying the positive electrode mixture paste;
    a step of assembling the nonaqueous electrolyte secondary battery by accommodating, in a battery outer case, the positive electrode, a negative electrode, and a nonaqueous electrolyte containing a compound having fluorine element; and
    a step of performing initial charge on the nonaqueous electrolyte secondary battery.

2. The manufacturing method according to claim 1, wherein
in the passing step, a pressure to be applied to the mixture in order that the mixture passes through the through hole of the liquid passage portion is 5 MPa or more.

3. The manufacturing method according to claim 1, wherein
the positive-electrode active material is a lithium nickel manganese oxide having a spinel structure.

* * * * *